United States Patent [19]
Culambourg et al.

[11] 3,802,962
[45] Apr. 9, 1974

[54] NEUTRON FLUX MEASUREMENT INSTALLATION FOR LIQUID-COOLED NUCLEAR REACTORS

[75] Inventors: Jacques Culambourg, Massy; Pierre Marmonier; Robert Naudet; Michel Sauvage, all of Aix-en-Provence, France

[73] Assignee: Commissariat a l'Energie Atomique, Paris, France

[22] Filed: Jan. 19, 1972
(Under Rule 47)

[21] Appl. No.: 219,094

[30] Foreign Application Priority Data
Jan. 20, 1971 France .............................. 71.01747

[52] U.S. Cl. .............................................. 176/19 R
[51] Int. Cl. .............................................. B21c 17/10
[58] Field of Search .................................. 176/19 R

[56] References Cited
UNITED STATES PATENTS
3,600,578   8/1971   Porges et al. ..................... 176/19 R
3,393,125   7/1968   Jackson ............................ 176/19 R
3,350,271   10/1967  Maidment et al. ................. 176/19 R
2,911,343   11/1959  Braffart et al. ................... 176/19 R

*Primary Examiner*—Reuben Epstein

[57] ABSTRACT

A stationary neutron detection chamber is placed beneath a reactor vessel which contains the coolant liquid and a reactor core constituted by an array of juxtaposed fuel assemblies designed for vertical insertion.

A removable tubular enclosure containing an inert gas has an upper portion located within the reactor core and corresponding in shape to the adjacent fuel assemblies. A cylindrical lower portion of the enclosure extends downwards from the core to the immediate vicinity of the reactor vessel wall and in vertically overhead relation to the neutron detector.

8 Claims, 1 Drawing Figure

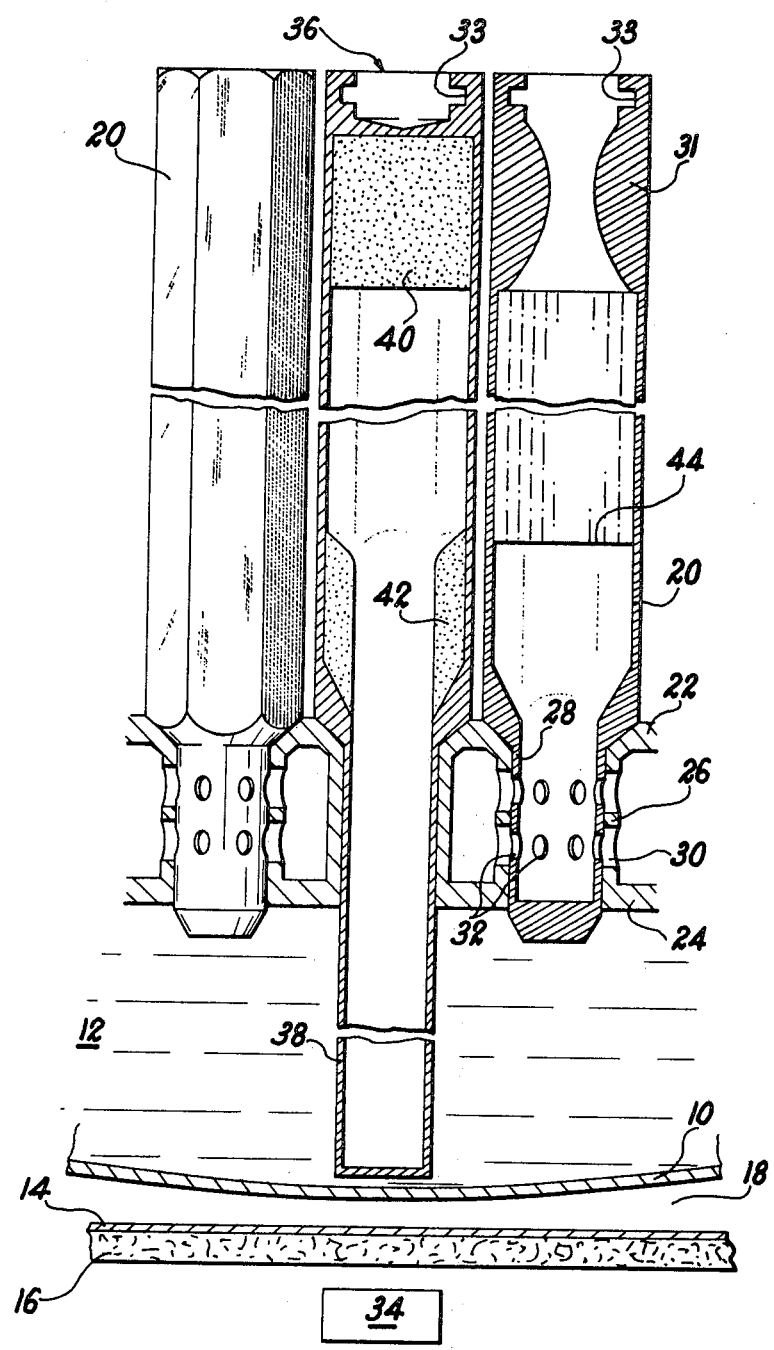

NEUTRON FLUX MEASUREMENT INSTALLATION FOR LIQUID-COOLED NUCLEAR REACTORS

This invention relates to a neutron flux measurement installation for liquid-cooled nuclear reactors, the installation being primarily intended for use in fast-neutron power reactors which are cooled by circulation of liquid sodium.

Nuclear reactors must be equipped with a neutron flux measurement installation which permits continuous monitoring of this flux both at the time of start-up and at the time of operation at full power. The choice of location of such chambers gives rise to a number of problems in fast reactors cooled by circulation of liquid metal and of the integrated heat-exchanger type. The neutron chambers which constitute the sensitive unit of the installation must in fact receive a neutron flux of sufficient intensity to provide an accurate measurement, namely of the order of $10^9$ n/cm$^2$/sec. As a necessary consequence, the unit must be close to the reactor core and be protected against the gamma radiation flux, it must be maintained at a temperature which is distinctly lower than that of the coolant and it must be readily accessible for replacement.

A number of different design solutions have been adopted in the past in order to solve these problems in fast reactors. For example, in the case of the "Phenix" reactor, provision is made for two sets of neutron chambers. The chambers which form part of one set and are employed for monitoring start-up of the reactor and measuring the power are placed in the air outside the main vessel containing the liquid sodium and beneath this latter, in the vicinity of the vertical axis of the reactor core. However, these chambers receive a neutron flux which is attenuated as a result of its passage through a number of metallic walls and through a layer of sodium and the intensity of which is somewhat low for the purpose of accurate measurement, in particular at the time of reactor start-up. The chambers forming part of the second set are located within vertical thimbles placed within the jacket of neutron shielding material which is disposed around the reactor core at the level of this latter, and are cooled by a gas. These chambers are displaceable in order that they may be brought to the level of the horizontal mid-plane of the reactor core, where the neutron flux is of maximum intensity. However, these vertical thimbles hinder fuel-handling operations and the flow of sodium is liable to set up vibrations in said thimbles. Moreover, this design solution cannot be extrapolated to high-power reactors having an output of more than about 500 Megawatts (electrical). Although it is possible in a medium-power reactor to connect the thimbles to the stationary top slab outside the movable components for top closure of the reactor vessel, this is in fact no longer possible in a high-power reactor of 1,000 MWe, for example; in fact, although the reactor core and the movable components of the top closure increase in diameter, the distance from the edge of the core at which it is advantageous to place the thimbles for accommodating the neutron chambers remains substantially constant. The vertical thimbles must accordingly be made to open into the movable components, which in turn makes it necessary to withdraw these components at the times of each handling operation and results in arrangements which are too complicated to be acceptable.

The aim of this invention is to provide a neutron flux measurement installation for liquid-cooled nuclear reactors, said installation being primarily intended to be employed in sodium-cooled fast power reactors and to meet practical requirements more effectively than comparable facilities of the prior art, especially insofar as this installation eliminates or at least reduces the above-noted disadvantages to a large extent.

With this objective, the installation in accordance with the invention comprises a neutron detection chamber placed beneath the reactor vessel containing the coolant liquid and the reactor core made up of vertically insertable fuel assemblies in juxtaposed relation and is primarily characterized in that it comprises a tubular enclosure containing an inert gas, said enclosure being placed vertically above the neutron detection chamber and extending downwards from the reactor core to the immediate vicinity of the internal wall of said reactor vessel.

The tubular enclosure is preferably designed to permit handling by means of the device which serves to handle the fuel assemblies or the control-rod drive mechanisms. The portion of said enclosure which is located within the reactor core advantageously corresponds in shape to a fuel assembly.

In a reactor which is cooled by circulation of liquid sodium, the tubular enclosure is advantageously occupied by an inert gas of the same type as the gas blanket which is located above the sodium (usually argon or helium) and the neutron chamber is placed beneath the safety vessel surrounding the primary vessel which contains the sodium.

Provision will obviously be made as a rule for a number of measuring installations, especially in power reactors. One of these installations can be placed in the vertical axis of the reactor core, namely at the point of highest neutron flux intensity. Other installations can be placed at the boundary between the reactor core (namely the portion containing the fissile material) and the lateral blanket (constituted by assemblies containing only fertile material).

A more complete understanding of the invention will be gained from the following description of an installation constituting a particular mode of application of the invention which is given by way of non-limitative example. The description refers to the single accompanying FIGURE which shows very diagrammatically, in cross-section on a vertical plane, an installation which is placed within a fast-neutron reactor as well as two adjacent fuel assemblies.

The installation which is illustrated in the single FIGURE is destined for use in a reactor having a main vessel containing a mass 12 of liquid sodium above which is placed a blanket of inert gas such as argon or helium (not shown). The main vessel 10, usually of stainless steel, is contained in a safety vessel 14 which is also of stainless steel lined with heat-insulating material 16. The space 18 formed between the two vessels is occupied by an inert gas (as a rule either argon or nitrogen) under a slightly higher pressure than the surrounding atmospheric pressure. There is placed within the reactor core a horizontal support grid or diagrid for receiving fuel elements 20 and distributing the liquid sodium coolant within these assemblies. The diagrid is made up of two tube-sheets 22 and 24 joined together by sleeves 26 for accommodating the fuel assembly end-fittings 28. The liquid sodium flows from the diagrid into the end-fittings through orifices 30 formed in the sleeves and orifices 32 formed in the end-fittings, then flows upwards within the fuel assemblies while cooling the canned-fuel pins, only the axes of which are shown diagrammatically in chain-dotted lines in one of the assemblies 20, and passes out through the top extremity of the assemblies. The top portion of each fuel assembly 20 as illustrated contains above the cluster of pins a block 31 of neutron-absorbing material and the arrangement of these blocks in juxtaposed relation constitutes a top neutron shield. An annular chamber 33 formed in the top portion of each fuel assembly 20 makes it possible to grip this latter by means of the grappler of a handling installation (not shown in the drawing). The fuel assemblies are placed in position individually by moving them downwards so as to engage the assembly end-fittings in a sleeve 26 of the diagrid. The end-fitting has a circular cross-section and the portion which is placed above the diagrid usually has a hexagonal cross-section so that each fuel assembly is placed within a compartment delimited by six adjacent assemblies.

The arrangement described thus far is conventional. The neutron flux measurement installation in accordance with the invention comprises a neutron detection chamber 34 which is placed beneath the main vessel 10 and the safety containment vessel 16, that is to say in a normal atmosphere. The chamber which is illustrated is placed in the axis of the reactor core. It could also be located in a different position and, in particular, vertically beneath the boundary between the core (constituted by assemblies containing fissile material) and the radial blanket (constituted by assemblies which contain only fertile material).

The sleeve 26 which is placed along the axis of the reactor core and opposite to the chamber 34 is intended to accommodate a closed tubular enclosure 36 in place of a fuel assembly 20. This enclosure 36 is made up of a top portion having the same overall vertical length and cross-sectional area as those of a fuel assembly 20, and of a bottom extension 38. The extension 38, the diameter of which is the same as that of an end-fitting 28, extends beneath the diagrid and terminates in the immediate vicinity of the internal wall of the primary vessel 10. The upper portion is provided with an annular chamber 33 which serves to handle the enclosure 36 in the same manner as a fuel assembly. This upper portion is advantageously constructed of stainless steel and delimits a chamber which contains an inert gas having a low neutron capture cross-section and usually consisting of either argon or helium. The mass of gas which occupies the enclosure is preferably chosen so that the pressure in the cold state is slightly higher than atmospheric pressure whilst the pressure at the operating temperature of the reactor then amounts to a few bars. In the embodiment which is illustrated, the top portion of the enclosure 36 is occupied by a block 40 of neutron-absorbing material which is placed at the level of the block 31 and completes the top biological protection. Provision can evidently be made within the enclosure for a number of different devices, subject to the sole condition that they are not conducive to substantial neutron absorption. In the embodiment which is illustrated, an annular packing 42 covers the internal wall of the enclosure 36 between the lower extremity of the reactor core (level 44) and the end-fitting.

By way of example, in a reactor having a height of core of 850 mm and an internal face located at 1,185 mm above the diagrid, the tubular extension 38 has a length of 3,600 mm from the top plate 22 of the diagrid and terminates at a distance of 20 mm from the bottom of the main vessel 10.

It is apparent that, in the installation which has just been described, the neutrons derived from the reactor core attain the chamber 34 after traversing only a small number of metallic walls including one of small thickness (bottom of the enclosure 36) and a thin sheet of sodium instead of the thick layer which lies between the diagrid and the bottom of the reactor vessel. In consequence, the neutron flux which reaches the chamber represents a substantial fraction of the neutron flux within the core.

In one advantageous mode of application of the invention, the top seal plug (not shown) of the reactor vessel is provided with a channel which can be brought opposite to the tubular enclosure 36. This enclosure can thus be readily removed and replaced in the event of a fault condition such as in-leakage of liquid sodium by making use of the device for handling the control-rod drive mechanisms.

The invention is obviously not limited solely to the embodiment which has been described by way of example with reference to the drawing and it must be understood that the scope of this patent extends to alternative forms which remain within the definition of equivalent means.

What we claim is:

1. A neutron flux measurement installation for liquid-cooled nuclear reactors comprising in combination a stationary neutron detection chamber beneath the reactor vessel containing the coolant liquid and the reactor core made up of vertically insertable fuel assemblies in juxtaposed relation, and a tubular enclosure containing an inert gas, said enclosure being vertically above the detection chamber and extending downwards from the reactor core to the immediate vicinity of the internal wall of said reactor vessel, the tubular enclosure being removable and having within the reactor core an external shape corresponding to the shape of said fuel assemblies and occupying a compartment defined by the adjacent fuel assemblies.

2. An installation according to claim 1 for a nuclear reactor which is cooled by circulation of liquid sodium, wherein the tubular enclosure contains an inert gas of the same type as the blanket gas which is present above the mass of sodium.

3. An installation according to claim 2, wherein said chamber is disposed beneath a safety vessel which surrounds the vessel containing the sodium.

4. An installation according to claim 1, wherein the tubular enclosure has a top portion within the reactor core and a cylindrical end-fitting which passes through a fuel-assembly support grid disposed within the primary vessel and which terminates in the immediate vicinity of said internal wall of said vessel.

5. An installation according to claim 1, wherein said tubular enclosure includes an extension above the reactor core containing a block of neutron-absorbing material which cooperates with blocks carried by the adjacent fuel assemblies to constitute a top neutron shield.

6. An installation according to claim 1, wherein the detection chamber and the associated tubular enclosure are disposed along the vertical axis of the reactor core.

7. An installation according to claim 1, wherein the detection chamber and the associated tubular enclosure are disposed at the boundary between the reactor core and a lateral fertile blanket.

8. An installation according to claim 1, wherein the reactor vessel has a top closure component provided with a pluggable access well positioned vertically above the tubular enclosure.

* * * * *